United States Patent [19]

Iwamatsu et al.

[11] Patent Number: 5,406,589
[45] Date of Patent: Apr. 11, 1995

[54] FRACTIONALLY SPACED CROSS-POLARIZATION INTERFERENCE CANCELLER

[75] Inventors: Takanori Iwamatsu; Toshiyuki Takizawa; Kenzo Kobayashi; Yoshihito Aono, all of Kawasaki, Japan

[73] Assignee: Fujitsu Limited, Kawasaki, Japan

[21] Appl. No.: 909,712

[22] Filed: Jul. 7, 1992

[30] Foreign Application Priority Data

Jul. 8, 1991 [JP] Japan .................................. 3-194803
Jul. 29, 1991 [JP] Japan .................................. 3-211520
Sep. 27, 1991 [JP] Japan .................................. 3-249206

[51] Int. Cl.$^6$ ...................... H04B 1/10; H01Q 21/06; H01Q 21/24
[52] U.S. Cl. ........................ 375/102; 375/99; 342/361; 455/295
[58] Field of Search ............... 375/14, 15, 99, 102, 375/103, 58; 342/361, 362; 455/295, 296

[56] References Cited

U.S. PATENT DOCUMENTS

| | | | |
|---|---|---|---|
| 4,550,415 | 10/1985 | Debus, Jr. et al. | |
| 4,910,468 | 3/1990 | Ohtsuka et al. | 375/102 |
| 4,914,676 | 4/1990 | Iwamatsu et al. | 375/102 |
| 5,023,620 | 6/1991 | Matsuura | 375/102 |
| 5,068,667 | 11/1991 | Mizoguchi | 342/362 |
| 5,241,320 | 8/1993 | Mizoguchi | 455/295 |

FOREIGN PATENT DOCUMENTS

| | | |
|---|---|---|
| 0420474 | 1/1991 | European Pat. Off. . |
| 1-235405 | 9/1989 | Japan . |
| 2-218229 | 8/1990 | Japan . |
| 2045585 | 10/1980 | United Kingdom . |

OTHER PUBLICATIONS

Siller, Jr., et al., "Decision-Directed Fractionally Spaced Equalizer Control Using Time-Domain Interpolation," *IEEE Transactions on Communications*, vol. 39, No. 2, Feb. 1991, pp. 182–186.

B. Lankl et al, "Cross-Polarization Interference Cancellation in the Presence of Delay Effects," International Conference on Communication (ICC), 1988, pp. 1355–1361.

*Primary Examiner*—Stephen Chin
*Assistant Examiner*—Duane Kobayashi
*Attorney, Agent, or Firm*—Staas & Halsey

[57] ABSTRACT

A fractionally spaced cross-polarization interference canceller, wherein a compensation signal is generated through an adaptive filter operating in a frequency that is an integer multiple of a transmission data frequency. The cross-polarization interference canceller includes a mechanism for generating an error signal used to control coefficients of the adaptive filter in the integer multiple frequency. The mechanism is realized, for example, by using a waveform generator generating an estimate of a baseband signal in the integer multiple frequency using a plurality of estimates of transmission data and coefficients determined by an impulse response of a transmission path.

11 Claims, 12 Drawing Sheets

FRACTIONALLY SPACED CROSS-POLARIZATION INTERFERENCE CANCELLER

BACKGROUND OF THE INVENTION

1. Field of the Invention

The present invention relates to a cross-polarization interference canceller (XPIC) using a fractionally-spaced adaptive filter for generating a compensation signal.

2. Description of the Related Art

In a radio transmission, a technique utilizing orthogonal polarization has been realized in order to elevate the utilization efficiency of frequencies, wherein signals are carried on two polarized waves orthogonal to each other (a vertically polarized wave (V) and a horizontally polarized wave (H)) having the same frequency.

In a system utilizing the orthogonal polarization, a high level of XPD (cross-polarization discrimination) is required to ensure stable transmission. Since the XPD sometimes deteriorates, for example, because of multipath fading in a microwave band or because of the presence of inclined raindrops in a frequency band higher than a semi-millimeter wave, the XPIC is introduced into the system in order to compensate for the deterioration of the XPD.

An adaptive transversal filter is normally used for shaping a received signal in the other polarization wave to thereby generate a compensation signal. The compensation signal is added to a main signal to compensate for the cross-polarization interference distortion. Coefficients of the adaptive transversal filter are controlled by correlating signals at tapped delay line nodes of the filter with an error signal in a compensated signal.

When a randomly varying phase difference occurs between two orthogonal polarization waves because of multipath feeding, etc., the compensation signal generator operating in a frequency of the transmission data cannot precisely compensate for the cross-polarization interference distortion. To overcome this problem, the introduction of a fractionally-spaced adaptive transversal filter having a fractionally-spaced tapped delay line and for updating the coefficients in a frequency more than two times the transmission data frequency, has been considered.

In a conventional compensation signal generator using the fractionally-spaced adaptive transversal filter, the error signal is updated only in the transmission data frequency. However, the signals at tapped delay line nodes used to calculate the coefficients are updated in the operating frequency of the filter because estimates of transmission data used to generate the error signal are obtained only in the transmission data frequency in a decision-directed adaptation. Therefore, in the conventional compensation signal generator, the adaptive filter applies an error value in the first half of a data interval to an error value in the second half of the data interval.

For this reason, the above compensation signal generator does not generate a precise compensation signal, particularly, in the second portions of data intervals. For example, in the extreme case of D/U=∞ (i.e., in the case that cross-polarization interference does not occur), although the compensation signal generator must generate a compensation signal having a level of zero, the compensation signal output from the generator has a level of zero in the first half of the data intervals and has levels freely varying in the second half of the data intervals. This results because the compensated signal in the second half of the data intervals are not reflected in the correction of levels of the compensation signal. This phenomenum wherein levels of zero and levels freely varying alternately appear is referred to as the "skewer" phenomenum.

SUMMARY OF THE INVENTION

It is an object of the present invention to provide a fractionally-spaced cross-polarization interference canceller wherein the skewer phenomenum does not occur.

It is another object of the present invention to provide a fractionally-spaced cross-polarization interference canceller wherein a more precise compensation is attained.

In accordance with the present invention, there is provided a cross-polarization interference canceller for compensating for the effect of cross-polarization interference on transmission data carried on a first polarized wave, comprising:

- a first analog/digital conversion means for converting a first analog baseband signal obtained from the first polarized wave into a first digital signal;
- a second analog/digital conversion means for converting a second analog baseband signal obtained from a second polarized wave orthogonal to the first polarized wave into a second digital signal in an integral multiple frequency of a frequency of the transmission data;
- a filter means for shaping the second digital signal into a compensation signal in the integral multiple frequency; the filter means having coefficients controlled using an error signal in a compensated signal;
- an addition means for adding the compensation signal to the first digital signal to thereby output the compensated signal; and
- an error signal creating means for creating the error signal in the integral multiple frequency.

DESCRIPTION OF THE PREFERRED EMBODIMENTS

Before describing the preferred embodiments according to the present invention, examples of the related art are given with reference to the accompanying drawings.

Figure 1:
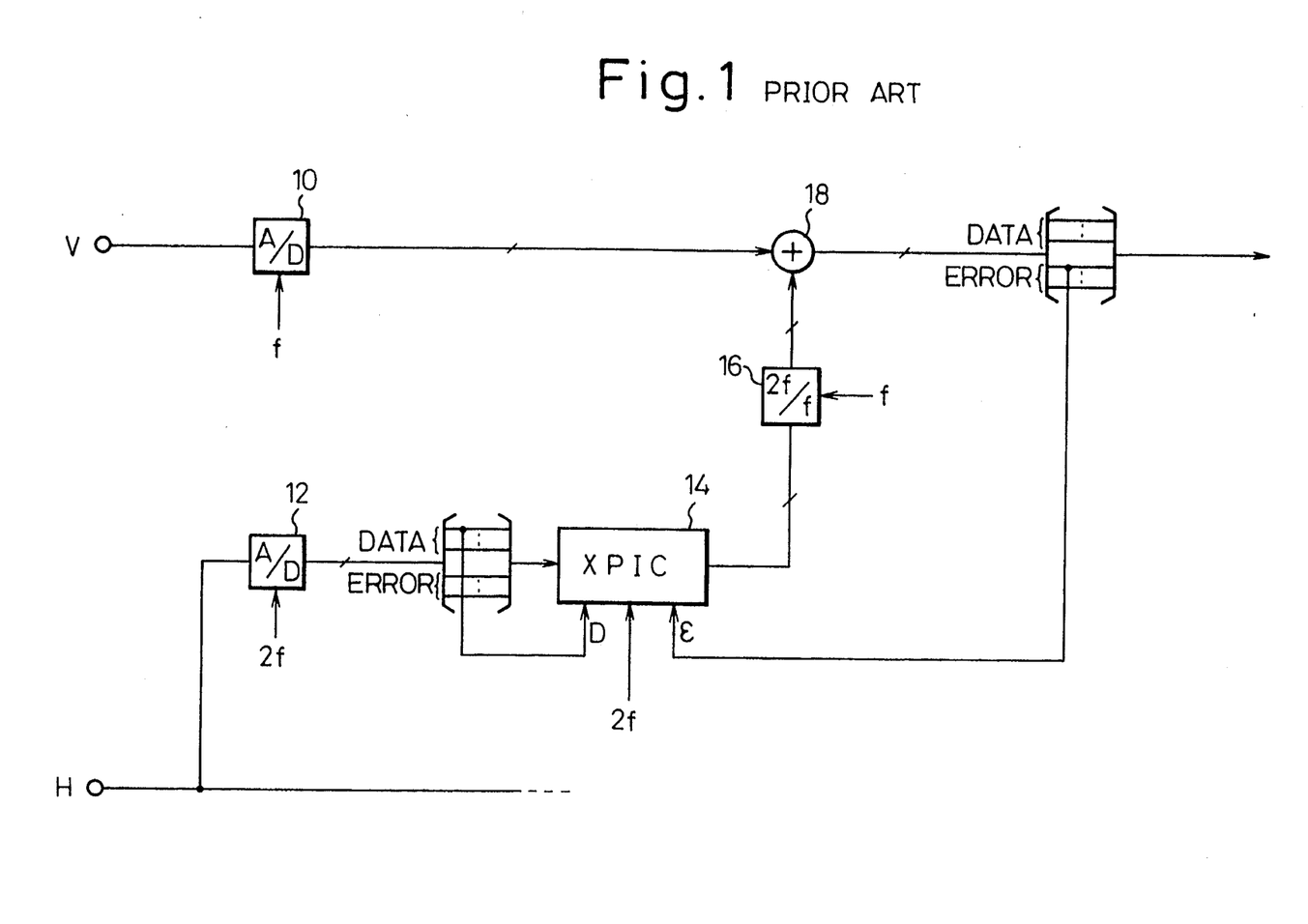
FIG. 1 is a block diagram showing the construction of a conventional fractionally-spaced cross-polarization interference canceller.

FIG. 1 shows the aforementioned conventional fractionally-spaced cross-polarization interference canceller.

A baseband signal obtained from a received vertically polarized wave (V) is converted into a digital signal consisting of a plurality of data bits in an analog/digital converter 10. The analog/digital converter 10 samples an input signal in synchronism with a clock signal having a frequency f of the transmission data frequency. A part of a baseband signal obtained from a received horizontally polarized wave (H) is distributed to generate a compensation signal. The distribution signal is converted into a digital signal consisting of a plurality of data bits in an analog/digital converter 12, and is fed into a compensation signal generator 14 including a transversal-type filter. The analog/digital converter 12 and the compensation signal generator 14 operates in synchronism with a clock signal having a frequency $2f$. An output signal of the compensation signal generator 14 is sampled in synchronism with the transmission data clock f to convert the frequency from $2f$ into f in a frequency converter 16. A compensation signal output from the frequency converter 16 is added to a main signal output from the analog/digital converter 10 in an adder 18.

Among data bits of the compensated signal output from the adder 18, a prescribed number of more significant bits represent transmission symbols and the other less significant bits represent a decision error. Thus, the most significant bit among the other less significant bits corresponds to a sign of the decision error, and therefore, is used as an error signal $\epsilon$ for calculating coefficients of the transversal filter of the compensation signal generator 14.

For example, in the case of 16 QAM (Quadrature Amplitude Modulation), a received signal is demodulated into an I-phase signal and a Q-phase signal, each having four levels. Therefore, more significant two bits represent transmission symbols and the third significant bit is used as the error signal. In FIG. 1 and the drawings described hereinafter, one of the circuits for an I-phase signal and a Q-phase signal is shown and the other is left out.

Figure 2:
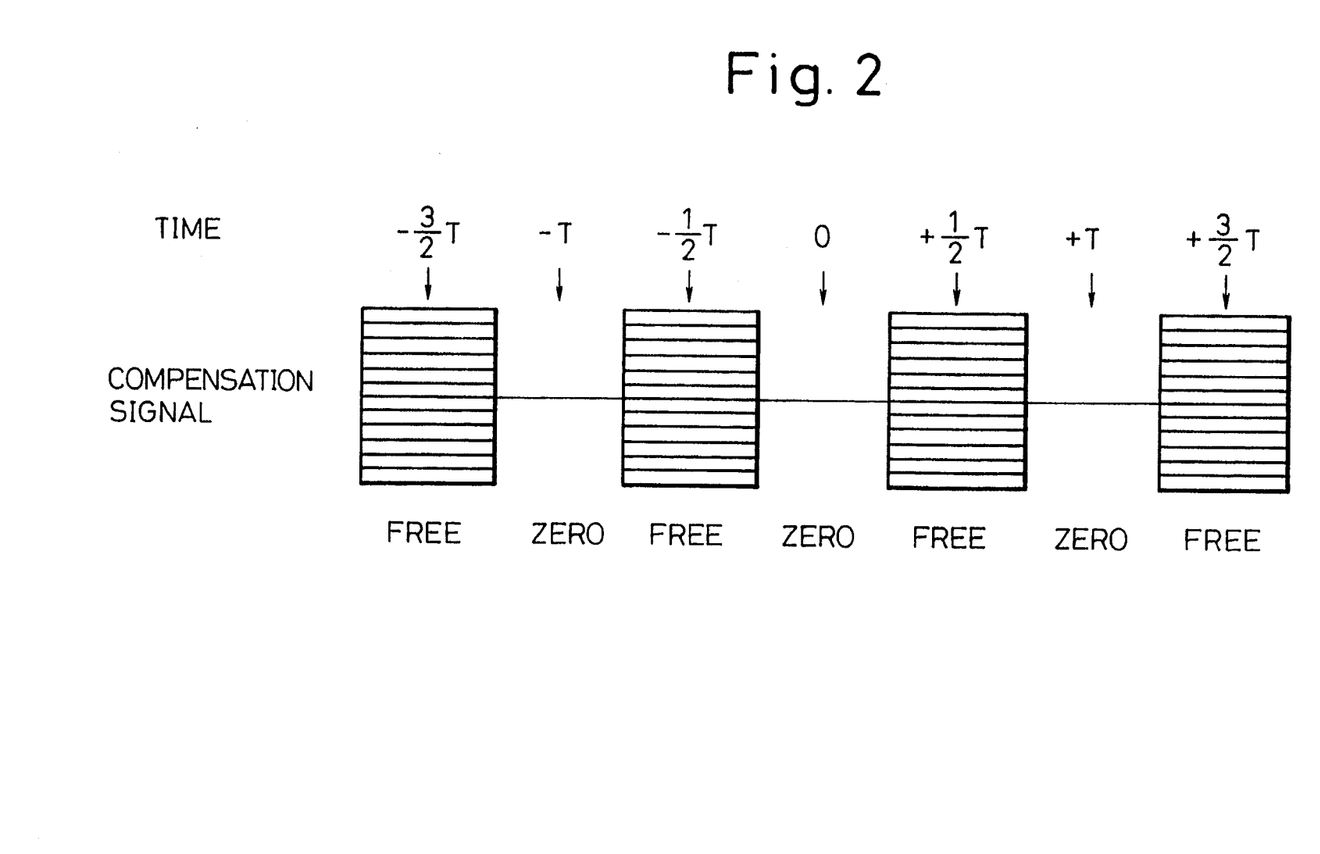
FIG. 2 is a diagram representing the "skewer" phenomenum.

As mentioned previously, in the conventional fractionally-spaced cross-polarization interference canceller shown in FIG. 1, a so-called "skewer" phenomenon occurs as shown in FIG. 2, wherein levels of the compensation signal in the second half of the data intervals T varies freely. This results because the compensation signal in the second half of the data intervals T are discarded in the frequency converter 16 and are not reflected in the correction of the compensation signal.

The preferred embodiments of the present invention will now be described with reference to the accompanying drawings.

Figure 3:
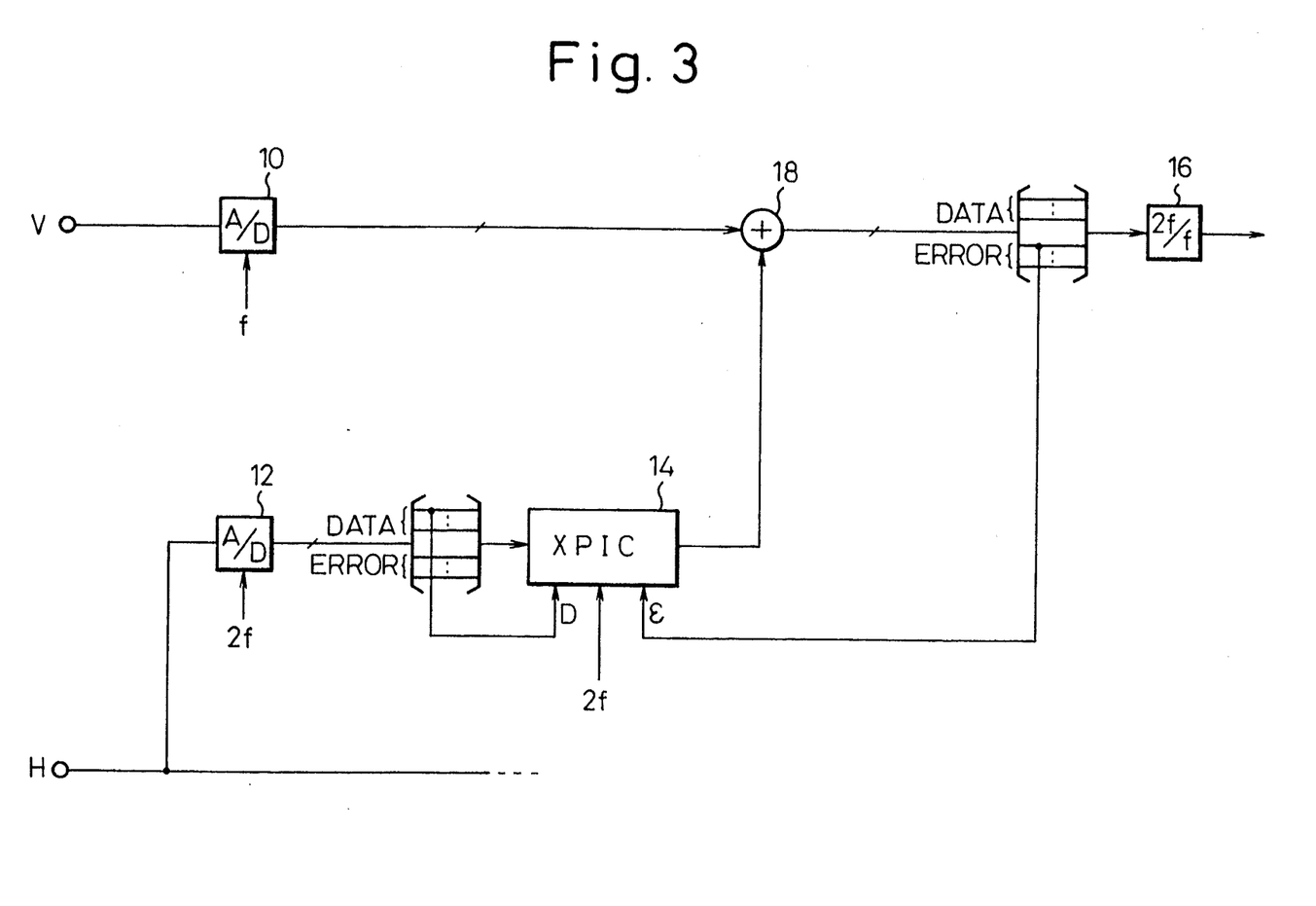
FIG. 3 is a block diagram showing the construction of the fractionally-spaced cross-polarization interference canceller according to an embodiment of the present invention.

FIG. 3 is a block diagram showing the construction of a cross-polarization interference canceller according to an embodiment of the present invention.

In this embodiment, the frequency converter 16 is provided in an output side of the adder 18, and the addition operation in the adder 18 is carried out in frequency $2f$. The error signal $\epsilon$ is taken from a signal between the adder 18 and the frequency converter 16. Therefore, the error signal $\epsilon$ is updated in frequency $2f$. Since the compensation results in the second half of the data intervals as well as the first half are fed back to the compensation signal generator 14, a compensation signal output from the compensation signal generator 14 converges to a level of zero in the extreme case of D/U=∞ and the "skewer" phenomenum does not occur.

The frequency converter 16 samples the output signal of the adder 18 at the first half of the data intervals, to thus outputs a more precise compensation result in frequency f.

Figure 4:
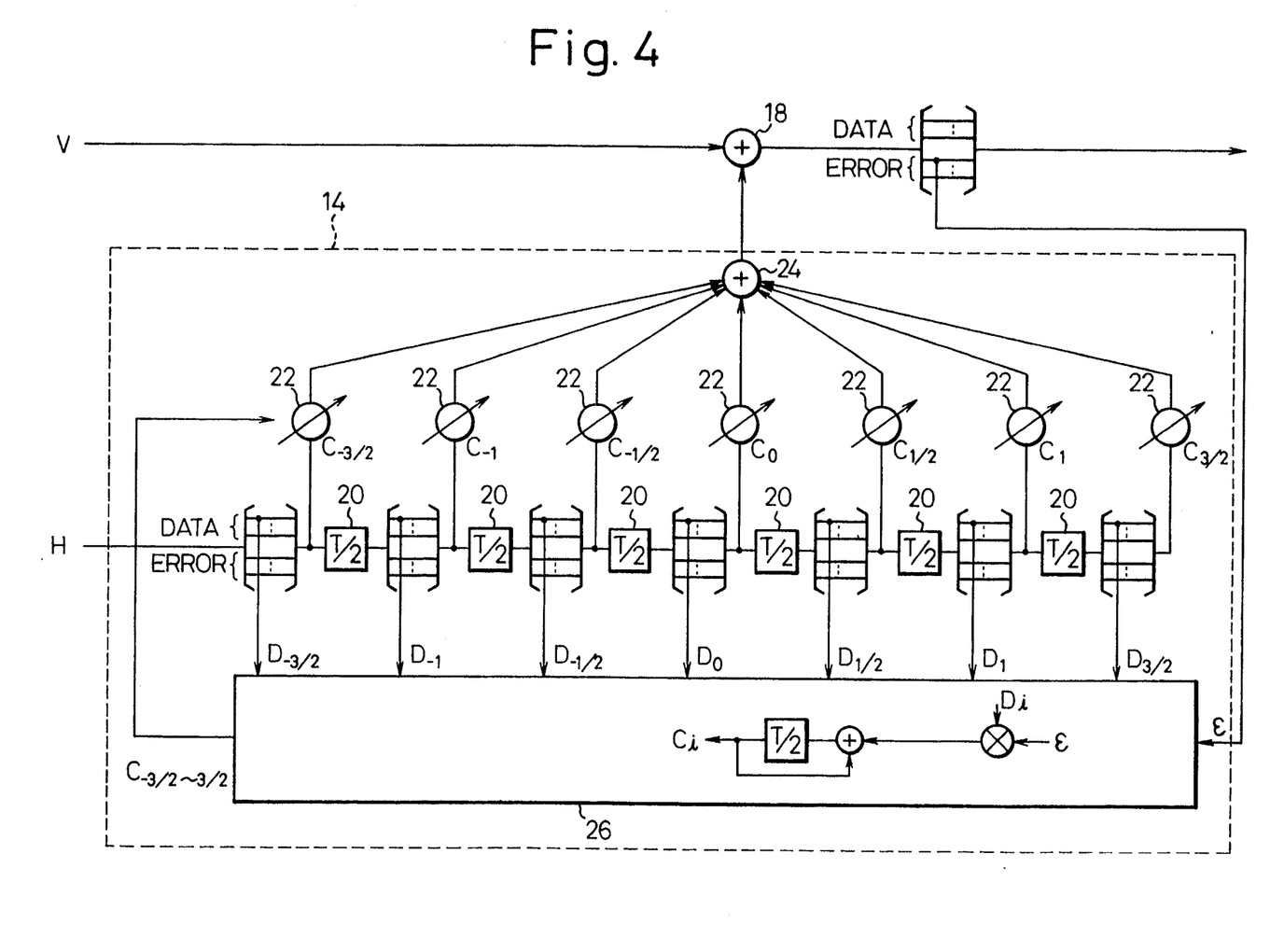
FIG. 4 is a block diagram showing a detailed construction of the compensation signal generator 14 of FIG. 3.

FIG. 4 shows an example of a more detailed construction of the compensation signal generator 14. The compensation signal generator 14 shown in FIG. 4 comprises a transversal-type filter consisting of six delay units 20, seven multipliers 22, and an adder 24. The six delay units 20 constitute a delay line having seven nodes spaced at T/2 intervals where T is a period of the transmission data. Input signals at the seven nodes are multiplied by coefficients $C_{-3/2}$, $C_{-1}$, $C_{-1/2}$, $C_0$, $C_{1/2}$, $C_1$, and $C_{3/2}$, respectively, in the multipliers 22, and are summed up in the adder 24 to generate the compensation signal. The coefficients $C_{-3/2}$ to $C_{3/2}$ are controlled in a coefficient control unit 26. The most significant bits of input data at the seven delay line nodes $D_{-3/2}$, $D_{-1}$, $D_{-1/2}$, $D_0$, $D_{1/2}$, $D_1$, and $D_{3/2}$, and the error bit $\epsilon$ are input to the coefficient control unit 26. The coefficients $C_{-3/2}$ to $C_{3/2}$ are calculated according to MZF (Modified Zero-Forcing) algorithm represented by the following formula.

$$C_i = \int D_i \times \epsilon \cdot dt; \text{ where } i = \pm 3/2, \pm 1, \pm \tfrac{1}{2}, 0 \qquad (1)$$

Other known control algorithms such as LMS (Least Mean Square) and MSE (Mean Square Error) may be used in the coefficient control unit 26.

Figure 5:
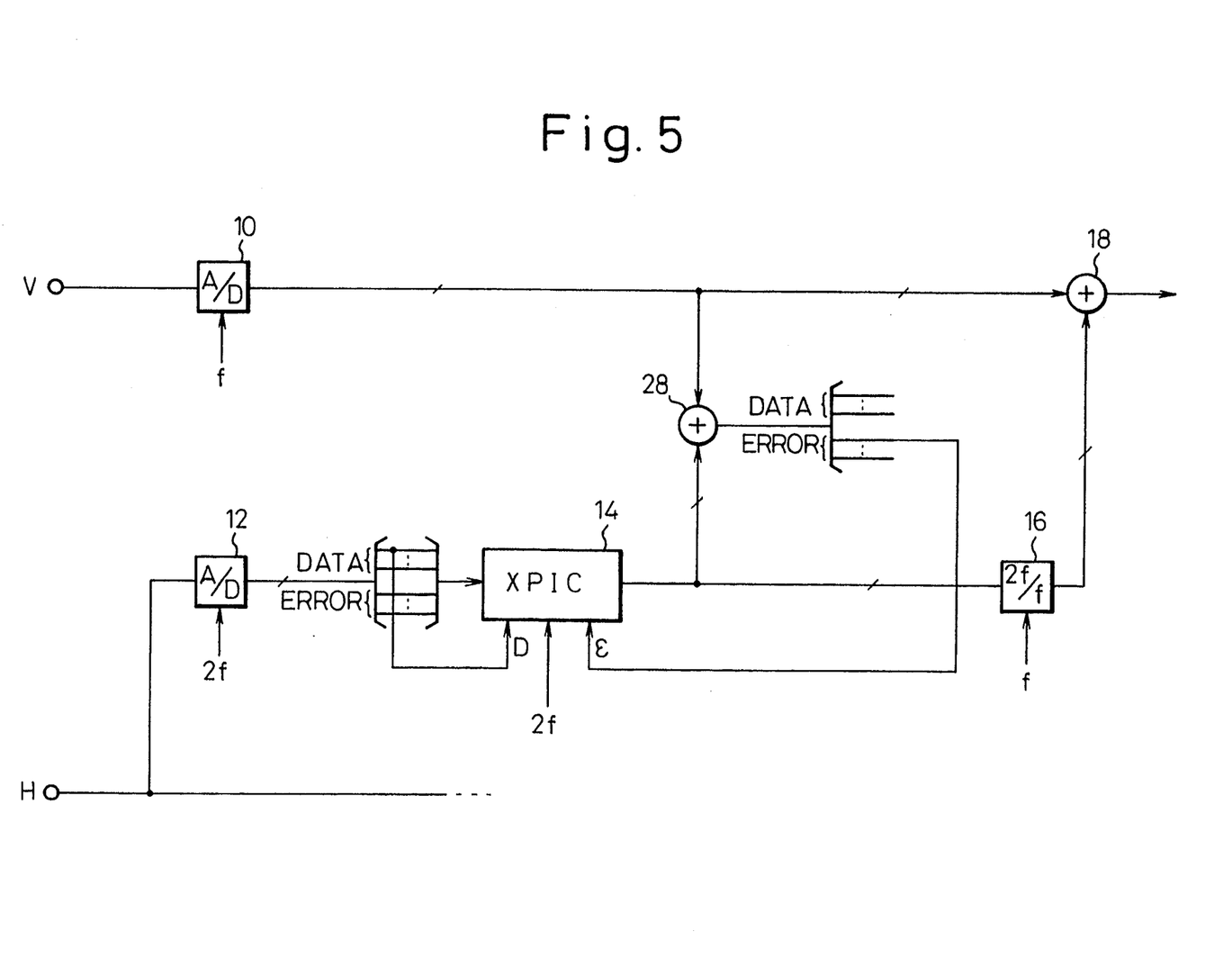
FIG. 5 is a block diagram showing the construction of the compensator according to another embodiment of the present invention.

FIG. 5 is a block diagram of a cross-polarization interference canceller according to another embodiment of the present invention. In contrast to that of FIG. 1, an adder 28 is further included. The adder 28 adds the compensation signal to the main signal to generate the error signal in frequency $2f$. Similar to the embodiment of FIG. 3, in the cross-polarization interference compensator of FIG. 5, the skewer phenomenum does not occur and a more precise compensation is attained.

Figure 6:
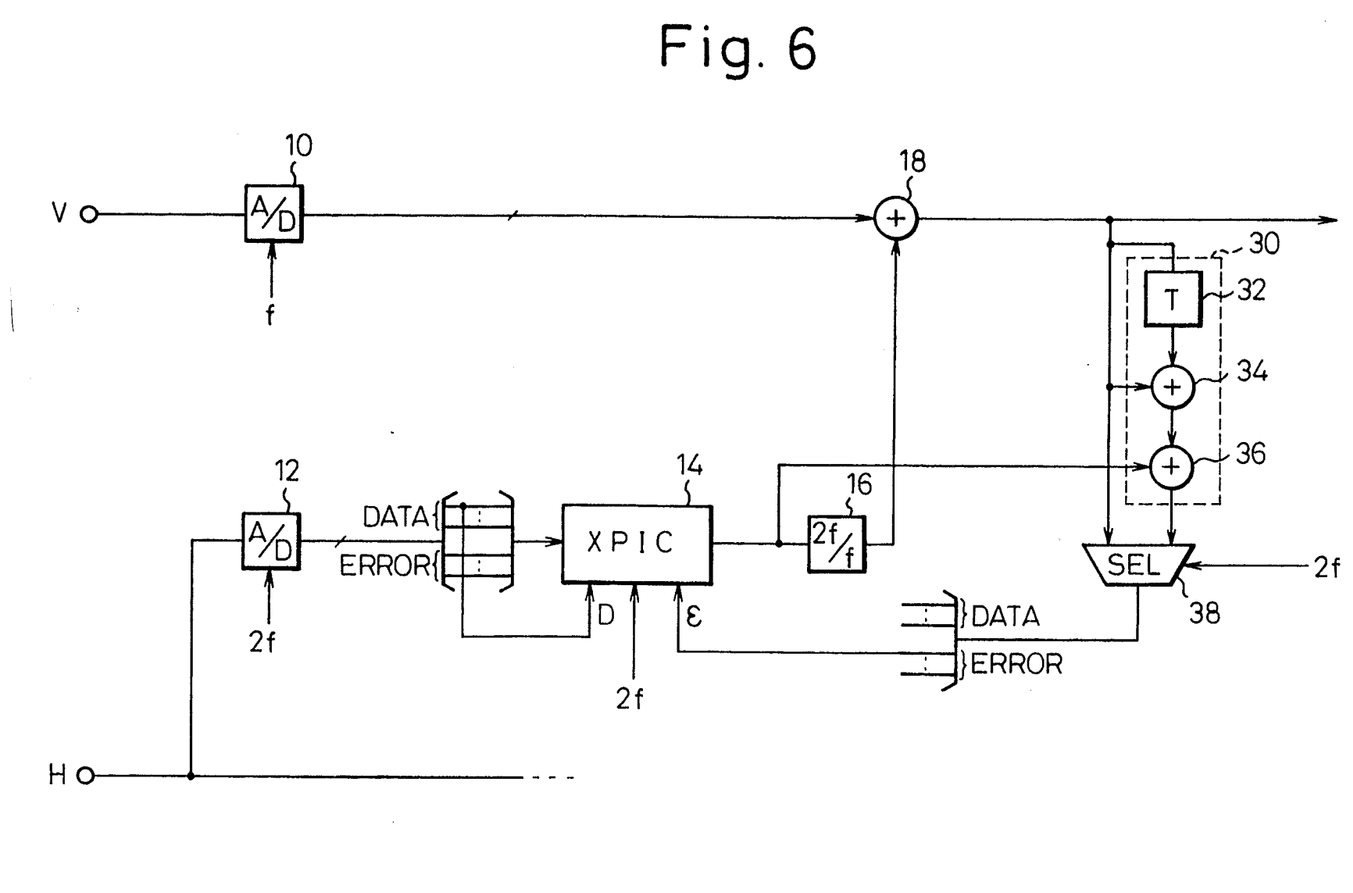
FIG. 6 is a block diagram showing the construction of the canceller according to another embodiment of the present invention.

FIG. 6 shows a cross-polarization interference canceller according to another embodiment of the present invention. The compensator of FIG. 6 comprises a interpolation calculation circuit 30 for generating a more precise error signal in the second half of the data intervals. The interpolation circuit 30 consists of a delay element 32, an adder 34, and an adder 36. The delay element 32 delays the output signal of the adder 18 by time T. The adder 34 adds a signal delayed by the delay element 32 to the output signal of the adder 18, and divides the sum by two by shifting the sum one bit position to the right. The output signal of the adder 34 corresponds to a mean value of two adjacent symbols. The adder 36 adds an output signal of the compensation signal generator 14 to the output signal of the adder 34, to calculate a more precise error signal in the second half of the data intervals. A selector 38 selects the output signal of the adder 18 in the first half of the data intervals and selects the output signal of the interpolation calculation circuit 30 in the second half of the data intervals and feeds the selected error signal to the compensation signal generator 14.

Figure 7:
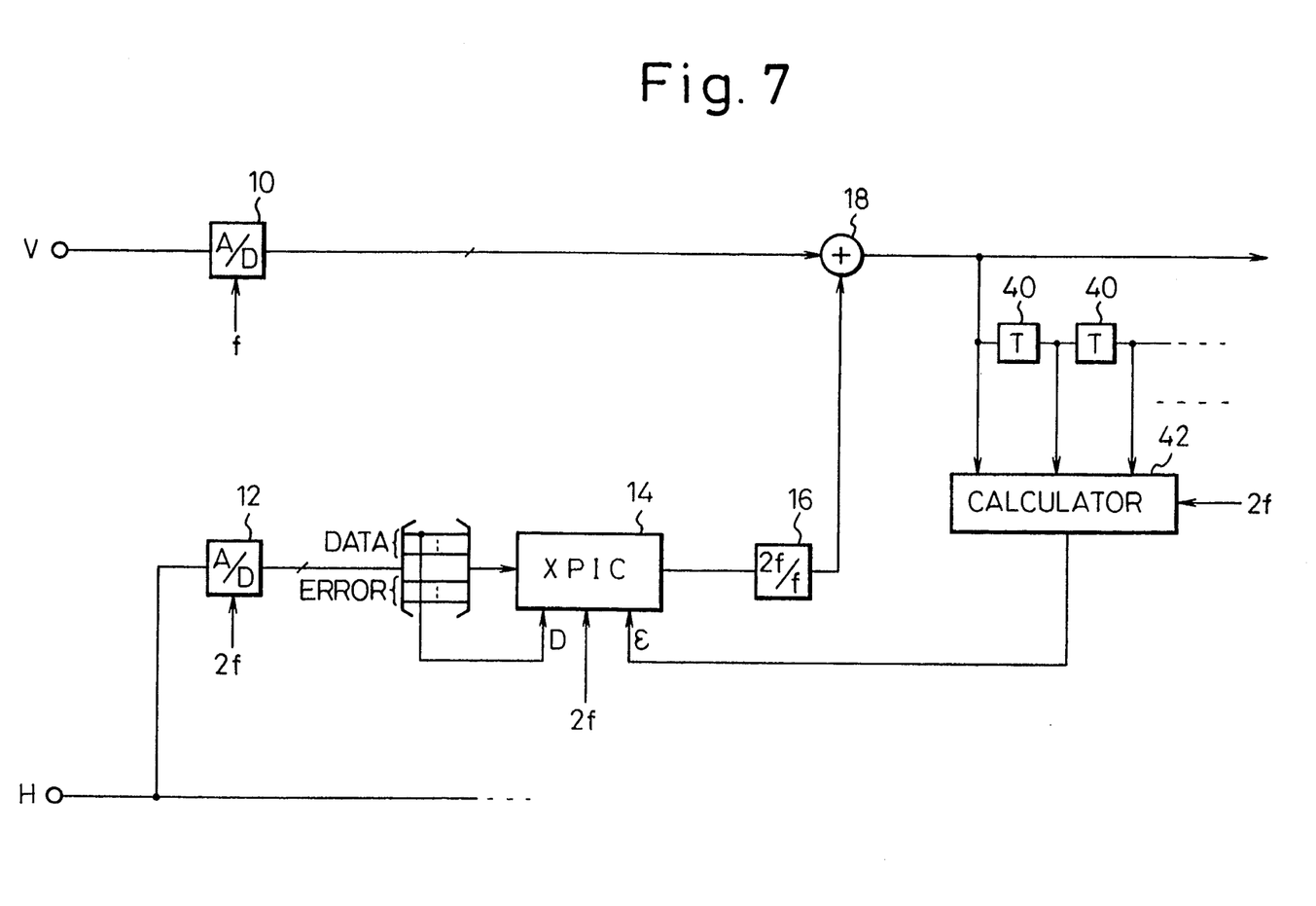
FIG. 7 is a block diagram showing the construction of the canceller according to another embodiment of the present invention.

FIG. 7 shows a cross-polarization interference canceller according to another embodiment of the present invention. The canceller of FIG. 7 comprises a plurality of delay elements 40 each having a delay time of T and a calculator 42. A plurality of time adjacent data obtained by the delay elements 40 are input to the calculator 42. The calculator 42 calculates a more precise error signal $\epsilon$ from the plurality of time adjacent data in the frequency 2f.

Figure 8:
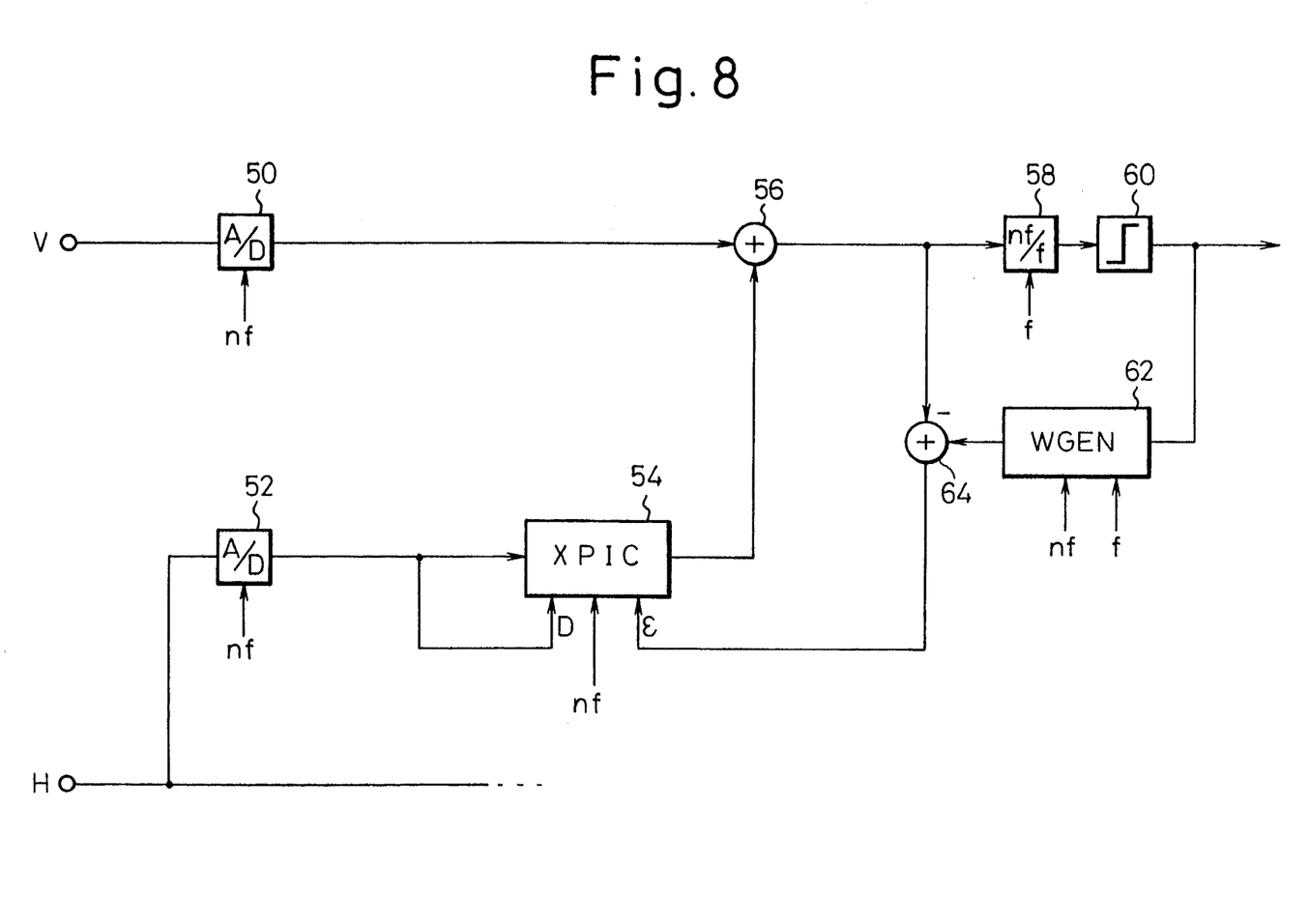
FIG. 8 is a block diagram showing the construction of the canceller according to another embodiment of the present invention.

FIG. 8 is a block diagram showing the construction of a cross-polarization interference canceller according to another embodiment of the present invention.

In FIG. 8, an analog/digital converter 50 for the main signal, an analog/digital converter 52 for the compensation signal, and a compensation signal generator 54 operate in synchronism with a clock signal having a frequency of nf where n is an integer more than two and f is a frequency of the transmission data. The compensation signal generator 54 comprises an adaptive transversal filter having a construction similar to that of FIG. 4, except that delay time of the delay units is T/n. A compensation signal generated in the generator 54 is added to the main digital signal in an adder 56. An output signal of the adder 56 is a compensated baseband signal varying in frequency nf. The compensated baseband signal is sampled in synchronism with a clock signal having a frequency f in a frequency converter 58, and the sampled signal is fed to a decision circuit 60 used to determine the transmission data. The decision circuit 60 may be realized by merely extracting more significant data bits as described previously with reference to FIG. 1.

A waveform generator 62., described in detail later, generates digital values of the baseband signal in frequency nf using the transmission data determined in the decision circuit 60 and coefficients of an impulse response of a transmission path. In a subtracter 64, an exact error signal $\epsilon$ is obtained in frequency nf by subtracting the compensated baseband signal from the estimate of the baseband signal output from the waveform generator 62.

Figure 9:
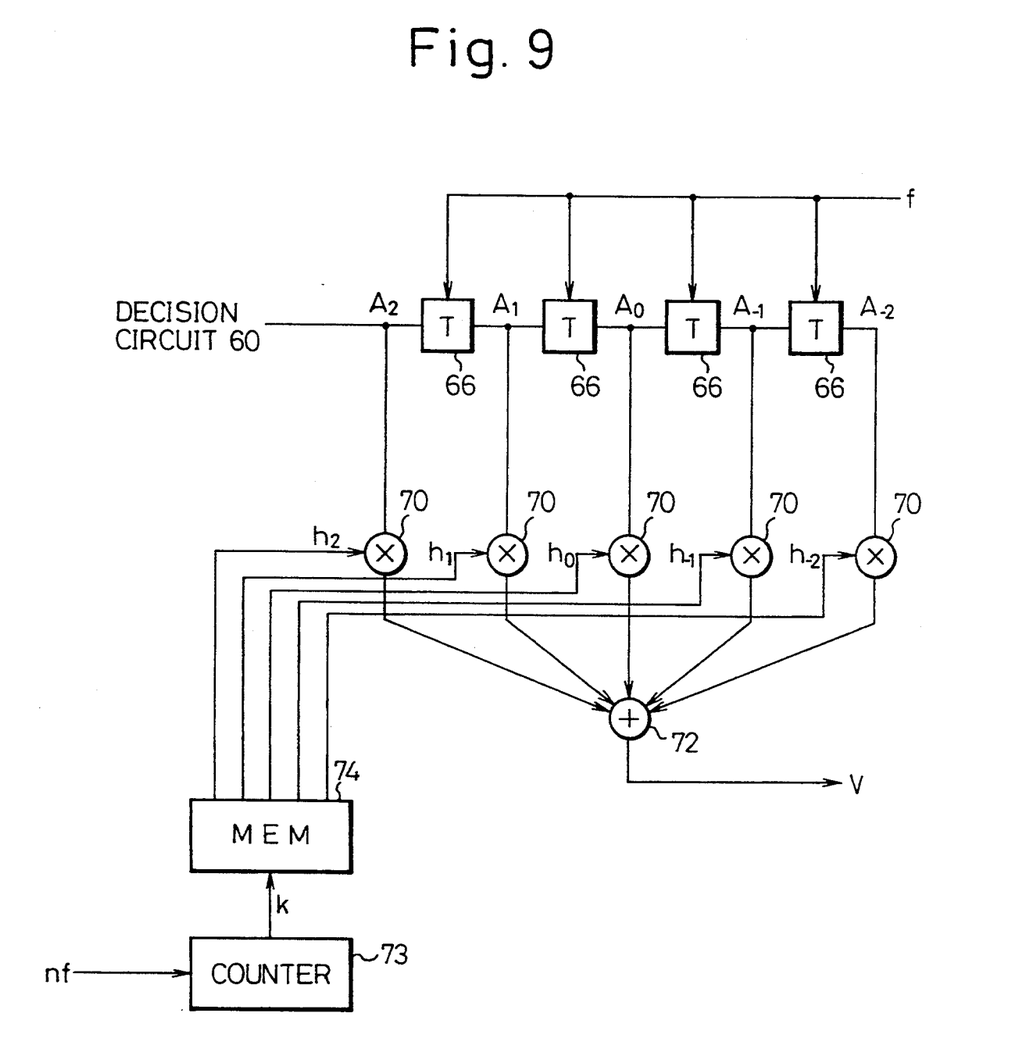
FIG. 9 is a block diagram showing the construction of an example of the waveform generator 62 of FIG. 8.

The value V of the baseband signal at any time can be represented by the formula $$V = \sum_{m=-\infty}^{\infty} A_m h_m \quad (2)$$

where $A_m$ is a value of the transmission data and $h_m$ is a coefficient determined from an impulse response. Therefore, waveform generator 62 of FIG. 8 is realized by a construction shown in FIG. 9. In FIG. 9, four delay elements 66 constitute a tapped delay line retaining the values $A_{-2}$ to $A_2$. Namely, the summation in formula (2) is calculated within a range from m=-2 to m=2. The values $A_{-2}$ to $A_2$ are multiplied by the coefficients $h_{-2}$ to $h_2$, respectively, in multipliers 70 and are summed up in an adder 72. A counter 73 counts the clock nf and cyclically outputs a count value k where k=0, 1 ... n-1. The memory 74 stores n sets of coefficients $h_{-2}$ to $h_2$ and cyclically outputs the coefficients $h_{-2}$ to $h_2$, according to the value k output from the counter 73. At the timing of clock f, i.e., when k=0, the memory 74 outputs $h_0=1$ and $h_{\pm 1}, \pm_2=0$. At the time displaced from the timing of clock f, i.e., when k=1, 2, ... n-1, the memory 74 outputs $$h_m = h\left(\frac{k}{n}T - mT\right),$$

where h(x) is a value of the impulse response in time x.

Figure 10:
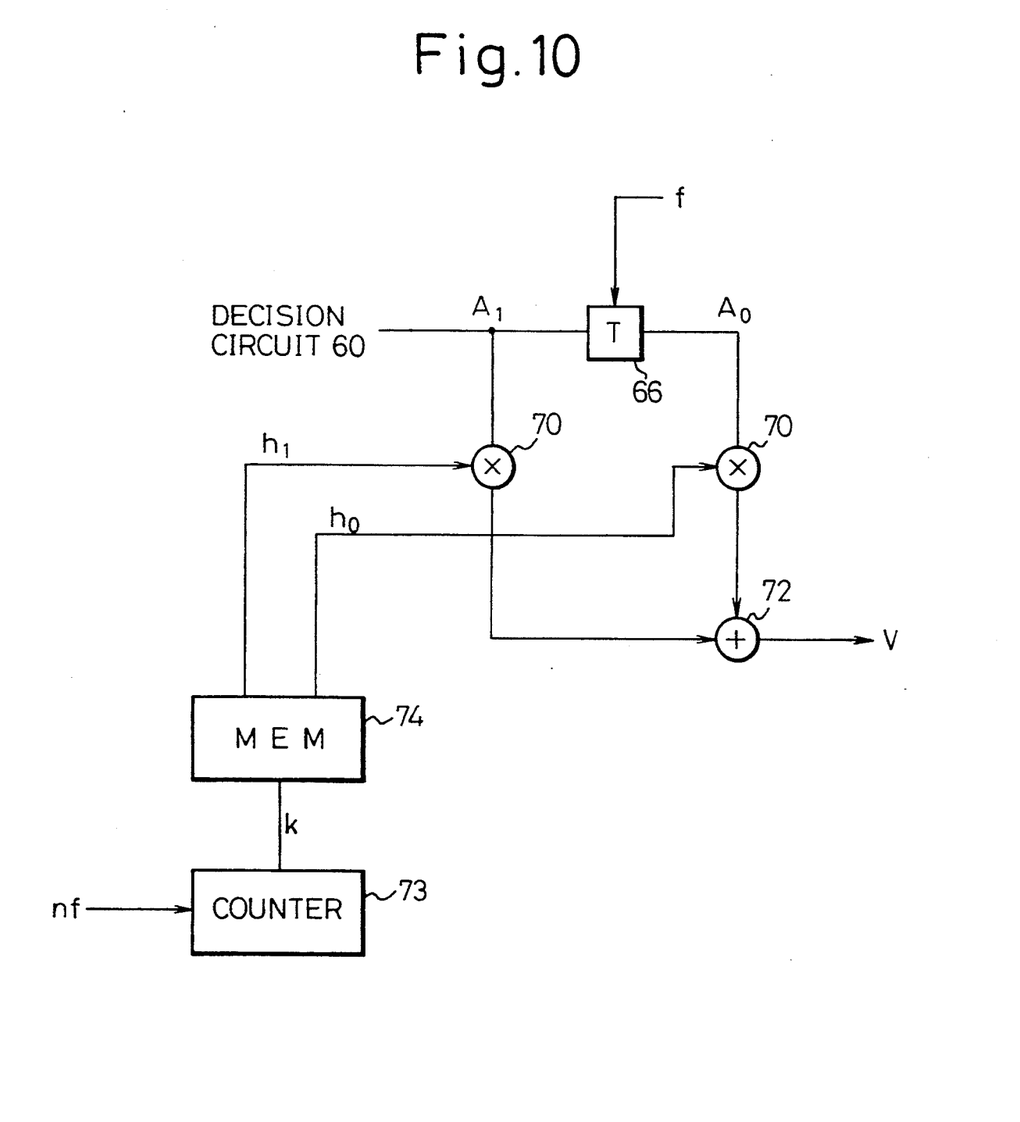
FIG. 10 is a block diagram showing the construction of another example of the waveform generator 62 of FIG. 8.

When the number of taps is two, the circuit is simplified as shown in FIG. 10.

Furthermore, upon considering an approximation of the baseband signal by linear interpolaration, the coefficients $h_0$ and $h_1$ are written as $$h_0 = 1 - k/n \quad (3)$$

$$h_1 = k/n \quad (4)$$

Figure 11:
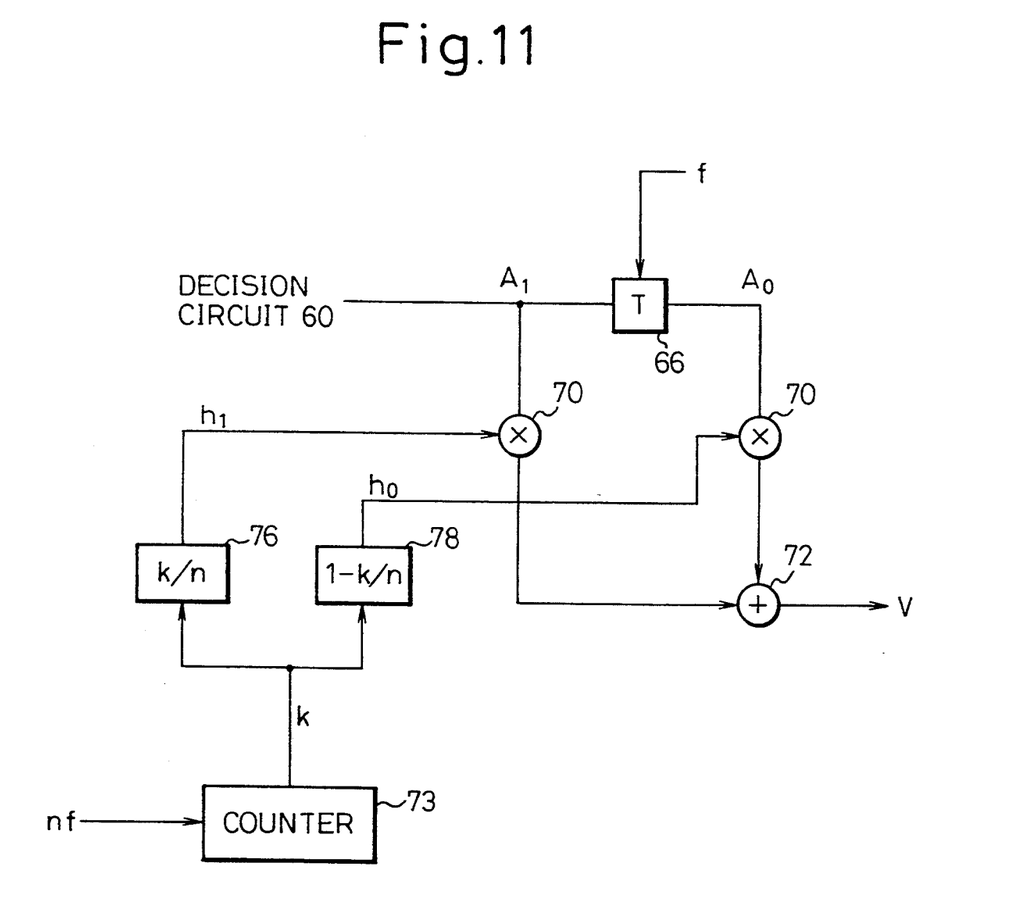
FIG. 11 is a block diagram showing the construction of another example of the waveform generator 62 of FIG. 8.

Thus, the circuit is further simplified as shown in FIG. 11. In FIG. 11, the memory 74 is replaced by calculators 76, 78.

Figure 12:
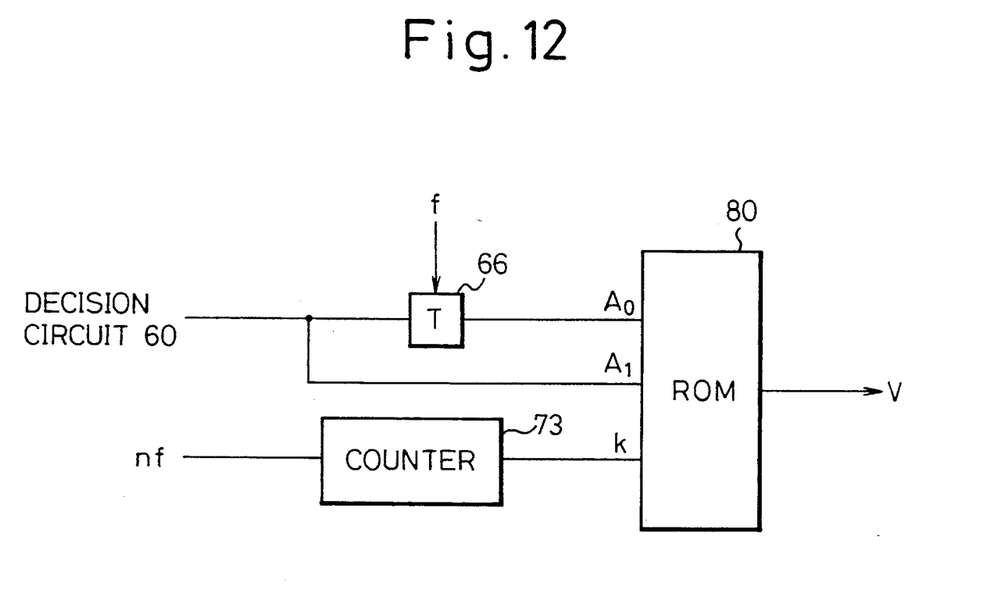
FIG. 12 is a block diagram showing the construction of another example of the waveform generator 62 of FIG. 8.

Furthermore, the multipliers 70, the adder 72, and calculators 76, 78 can be replaced by a read-only memory 80 as shown in FIG. 12. In FIG. 12, the values $A_0$, $A_1$ and k are input to the read-only memory 80 as an address input, and the read-only memory 80 outputs the value V of the baseband signal determined by the address input. The values V are calculated in advance according to the formulae (2), (3) and (4) and are stored in the read-only memory 80.

We claim:

1. A cross-polarization interference canceller which compensates for the effect of cross-polarization interference on transmission data carried on a first polarized wave, the first polarized wave containing a first analog baseband signal, wherein a second polarized wave containing a second analog baseband signal is orthogonal to the first polarized wave, the cross-polarization interference canceller comprising:

first analog/digital conversion means for converting the first analog baseband signal of the first polarized wave into a first digital signal;

second analog/digital conversion means for converting the second analog baseband signal of the second polarized wave into a second digital signal, the second analog/digital conversion means being synchronized at a frequency which is an integer multiple frequency of the frequency of the transmission data and is at least twice the frequency of the transmission data;

filter means, having selectively controllable filtering coefficients and operating in synchronization with the integer multiple frequency, for shaping the second digital signal into a compensation signal and outputting the compensation signal;

addition means for receiving the first digital signal and the compensation signal, adding the compensation signal to the first digital signal and outputting a corresponding compensated signal; and error signal creating means for creating, in the integer multiple frequency, an error signal which is input to the filtering means and used to control the filtering coefficients.

2. A cross-polarization interference canceller as in claim 1, wherein the first analog/digital conversion means is synchronized at the frequency of the transmission data.

3. A cross-polarization interference canceller as in claim 2, wherein the error signal creating means creates the error signal from the compensated signal output from the addition means so that the error signal is updated in the integer multiple frequency.

4. A cross-polarization interference canceller as in claim 2, in which the compensated signal contains successive and adjacent transmission data portions, wherein the error signal creating means comprises:
 a calculating unit which receives first and second successive and adjacent transmission data portions, calculates a mean value of the first and second transmission data portions and produces a corresponding output signal;
 an adding unit which receives the compensation signal and the output signal of the calculating unit, adds the compensation signal to the output signal of the calculating unit, and produces a corresponding output signal; and
 a selecting unit which receives the output signal of the adding unit and the compensated signal and selects one of the output signal of the adding unit and the compensated signal as a signal used to create the error signal.

5. A cross-polarization interference canceller as in claim 2, wherein the error signal creating means comprises:
 a delay line including:
  an input end receiving the compensated signal, and
  a plurality of taps sequentially spaced at delay intervals from the input end, each tap providing a respectively delayed signal; and
 a calculator, synchronized at the integer multiple frequency, which receives the delayed signals provided by the plurality of taps and creates the error signal from the delayed signals.

6. A cross-polarization interference canceller as in claim 1, wherein the compensated signal contains transmission data, the first analog/digital conversion means is synchronized at the integer multiple frequency, and the error signal creating means comprises:
 decision means for determining the transmission data from the compensated signal and producing an output which represents an estimate of the transmission data;
 estimate generating means, receiving the output of the decision means, for generating and outputting, in the integer multiple frequency, an estimate of the first analog baseband signal based on the output of the decision means; and
 subtraction means, receiving the compensated signal and the estimate which is output from the estimate generating means, for subtracting the compensated signal from the estimate to create, in the integer multiple frequency, the error signal.

7. A cross-polarization interference canceller as in claim 6, wherein the estimate generating means comprises:
 a delay line including:
  an input end receiving the output of the decision means, and
  a plurality of taps sequentially spaced from the input end at delay intervals, which concurrently provide a plurality of respectively delayed and adjacent estimates of the transmission data;
 a counter which receives a clock signal of the integer multiple frequency, counts the clock signal and outputs a count; and
 estimate determining means, receiving the count output from the counter and the respective, delayed and adjacent estimates provided by the plurality of taps, for determining an estimate of the first analog baseband signal based on the count and the estimates provided by the plurality of taps.

8. A cross-polarization interference canceller as in claim 7, wherein the estimate determining means comprises:
 coefficient providing means, receiving the count from the counter, for providing a set of coefficients based on the count;
 a plurality of multipliers each having respective first and second inputs, the plurality of multipliers including a first multiplier corresponding to the decision means and receiving the output of the decision means in the respective first input, and additional multipliers each having an individually corresponding tap of the plurality of taps and receiving the respective estimate of the transmission data from the corresponding tap in the respective first input, each of the plurality of multipliers receiving a respective coefficient from the set of coefficients provided by the coefficient providing means in the respective second input, the plurality of multipliers each multiplying the respective first and second inputs to produce respective, corresponding outputs; and
 an adder which receives the outputs of the plurality of multipliers and sums the outputs of the plurality of multipliers to output an estimate of the first analog baseband signal.

9. A cross-polarization interference canceller as in claim 8, wherein the coefficient providing means comprises a memory which stores a plurality of sets of coefficients, the memory having an address input and receiving the count in the address input for selectively addressing the plurality of sets according to the count.

10. A cross-polarization interference canceller as in claim 8, wherein the coefficient providing means includes a calculator for calculating the set of coefficients from the count.

11. A cross-polarization interference canceller as in claim 7, wherein the estimate determining means includes a memory which stores a plurality of estimates of the first analog baseband signal, the memory having an address input in which is received the count and the respective, delayed and adjacent estimates of the transmission data provided by the plurality of taps, to selectively address and output an estimate of the first analog baseband signal.

* * * * *

UNITED STATES PATENT AND TRADEMARK OFFICE
CERTIFICATE OF CORRECTION

PATENT NO. : 5,406,589
DATED : April 11, 1995
INVENTOR(S) : Takanori IWAMATSU, et al.

It is certified that error appears in the above-indentified patent and that said Letters Patent is hereby corrected as shown below:

Col. 3, line 25, delete "f" and insert therefor $--f--$;
Line 37, delete "f", both occurrences, and insert therefor $--f--$.

Col. 4, line 23, delete "f" and insert therefor $--f--$;
Line 45, delete "C$^i$" and insert therefor $--C_i--$;
*Line 61, delete "a" and insert therefor --an--.

Col. 5, lines 29, 37, 46 and 49, delete "nf" and insert therefor $--nf--$;
Lines 30 and 39, delete "f" and insert therefor $--f--$;
Line 44, delete "62.," and insert therefor --62,--;
Line 61, after "Therefore,", insert --the--.

Col. 6, line 1, delete "nf" and insert therefor $--nf--$;
Line 5, delete "f" and insert therefor $--f--$.

Signed and Sealed this

Twentieth Day of June, 1995

Attest:

BRUCE LEHMAN

Attesting Officer          Commissioner of Patents and Trademarks